(12) United States Patent
Rieder et al.

(10) Patent No.: US 6,348,093 B1
(45) Date of Patent: Feb. 19, 2002

(54) BASIC-MEDIUM-SOLUBLE PACKAGING MATERIAL FOR USE IN CASTABLE CEMENTITIOUS COMPOSITES

(75) Inventors: Klaus-Alexander Rieder, Salem; William J. Hurley, Jr., Needham; Anandakumar Ranganthan, Lowell; Michael B. Macklin, Westford, all of MA (US)

(73) Assignee: W. R. Grace & Co. - Conn, New York, NY (US)

( * ) Notice: Subject to any disclaimer, the term of this patent is extended or adjusted under 35 U.S.C. 154(b) by 0 days.

(21) Appl. No.: 09/559,624

(22) Filed: Apr. 27, 2000

(51) Int. Cl.[7] .................................................. C04B 24/04
(52) U.S. Cl. ....................... 106/724; 106/728; 106/823; 524/5; 206/219; 206/321
(58) Field of Search .................. 206/219, 321; 106/819, 724, 823, 728; 524/5

(56) References Cited

U.S. PATENT DOCUMENTS

| | | | |
|---|---|---|---|
| 1,916,531 A | 7/1933 | Robb | 259/153 |
| 2,127,402 A | 8/1938 | Gillican | 226/47 |
| 2,560,649 A | 7/1951 | Hornaday | 15/208 |
| 3,056,491 A | 10/1962 | Campbell | 206/56 |
| 3,216,556 A | 11/1965 | Rosenthal | 206/84 |
| 3,294,224 A | 12/1966 | Horwitz | 206/46 |
| 3,580,390 A | 5/1971 | Shull, Jr. | 206/46 |
| 3,863,758 A | 2/1975 | Connelly | 206/84 |
| 3,892,905 A | 7/1975 | Albert | 428/220 |
| 4,261,066 A | 4/1981 | Belz | 4/222 |
| 4,469,728 A | 9/1984 | Belz | 428/36 |
| 4,551,369 A | 11/1985 | Belz | 428/36 |
| 4,748,069 A | 5/1988 | Cullen | 428/195 |
| 4,844,828 A | 7/1989 | Aoki | 252/90 |
| 4,870,148 A | 9/1989 | Belz | 526/318.41 |
| 4,961,790 A | 10/1990 | Smith et al. | 106/823 |
| 4,990,146 A | 2/1991 | Deibig et al. | 604/332 |
| 5,094,912 A | 3/1992 | Deibig et al. | 428/355 |
| 5,120,367 A * | 6/1992 | Smith et al. | 106/823 |
| 5,203,629 A | 4/1993 | Valle et al. | 366/2 |
| 5,224,595 A | 7/1993 | Sugimoto et al. | 206/321 |
| 5,224,774 A | 7/1993 | Valle et al. | 366/2 |
| 5,317,043 A | 5/1994 | Gass | 521/43.5 |
| 5,320,851 A | 6/1994 | de Mars et al. | 424/451 |
| 5,322,878 A | 6/1994 | Deibig et al. | 524/414 |
| 5,336,755 A | 8/1994 | Pape | 528/486 |
| 5,346,955 A | 9/1994 | Sasse et al. | 525/92 |
| 5,378,751 A | 1/1995 | Deibig et al. | 524/414 |
| 5,728,209 A * | 3/1998 | Bury et al. | 106/819 |
| 5,846,075 A * | 12/1998 | Suh et al. | 433/23 |
| 5,985,449 A | 11/1999 | Dill | 428/399 |

FOREIGN PATENT DOCUMENTS

| | | |
|---|---|---|
| EP | 0062129 A2 | 11/1981 |
| GB | 2073603 A | 10/1981 |
| JP | Hei 3-53084 | 8/1991 |
| JP | 2000034147 | 7/1998 |
| WO | W/O 99/46214 | 9/1999 |

OTHER PUBLICATIONS

Davis Colors Soluble Bags, Frank B. Davis Co., 1993, 1 page.

Grace–Concrete Mixtures, Grace Fibers, Fiber Reinformcement For Concrete, W.R. Grace & Co.–Conn., 1989, 1 page.

* cited by examiner

Primary Examiner—Paul Marcantoni
(74) Attorney, Agent, or Firm—Craig K. Leon; William L. Baker

(57) ABSTRACT

Exemplary packaging of the invention can be introduced in a sealed form directly into a mixer, whereby, upon agitation of the mixer, a cemenititous binder, an admixture or admixtures, and/or fibers can be released to make or modify, in the mixer, a castable cementitious composition within which the packaging material, which is made of a non-water-soluble, basic-medium-soluble polymeric material, can disappear from sight.

35 Claims, 3 Drawing Sheets

BASIC-MEDIUM-SOLUBLE PACKAGING MATERIAL FOR USE IN CASTABLE CEMENTITIOUS COMPOSITES

FIELD OF THE INVENTION

The present invention relates to admixtures for making or modifying castable cementitious compositions, and more particularly to a basic-medium-soluble packaging system placed directly into a mixer wherein a castable cementitious composition acts to dissolve the packaging material.

BACKGROUND OF THE INVENTION

Packaging for dispensing admixtures directly into concrete mixes is known. One benefit of such packaging is that admixtures to be contained in the packaging can be pre-weighed to reduce error at the application site.

Japanese Patent Application Sho 50-14722 (Laid Open Number) of Kiyoshi Watanabe et al. taught that a sack made of water-soluble film could be thrown into the hopper of a mix truck so as to introduce a surfactant into a mortar or concrete being mixed in the truck. Upon agitation of the mix, the sack began to dissolve in the water of the mix, and the contents could be dispersed therein. The water-soluble sack consisted of a water-soluble material such as polyvinyl alcohol, polyethylene oxide, amylose, methylcellulose, hydroxypropylcellulose, or starch.

U.S. Pat. No. 4,961,790 of Smith et al. disclosed a water-soluble container made of polyvinyl alcohol or polyethylene oxide and containing a solid admixture, e.g., water-reducing admixture, superplasticizer, fibers, or other agents for modifying concrete. Similar to Watanabe's soluble sack, the bags of Smith et al. required an outer protective wrapper to prevent the bag from dissolving during transportation or before use at the construction site.

U.S. Pat. Nos. 5,203,629 and 5,224,774 of Valle et al. disclosed non-soluble bags, on the other hand, for introducing solid admixtures into a fresh concrete or mortar. Upon agitation in a mix, the paper (e.g., kraft pulp) disintegrated and allowed the admixtures contained inside the bag to be distributed within the concrete or mortar. With sufficient mechanical agitation of the concrete mix, the non-soluble bag material was broken down by the grinding action of the aggregates in the mix into harmless pulp. Although the non-soluble bags could be transported in outer packaging to facilitate palletizing, these bags were not prone to being destroyed simply by rain at the construction site, unlike previous bags that were made of water-soluble materials.

U.S. Pat. No. 5,224,595 of Sugimoto et al. pertained to an alkali hydrolyzable packaging material made of pulp fibers (e.g., made of wood, non-wood, rayon, polyester, hemp, etc.) bound together by a polymer. The polymer included polysaccharide derivatives such as carboxymethyl cellulose, carboxyethyl vellulose, and carboxymethylated starch, or their salts, as well as synthetic polymer binders (e.g., polymers of unsaturated carboxylic acids) and natural polymer binders (e.g., alginic acid, xanthum gum, etc.). The polymeric binder was weakened in the alkali environment of a fresh concrete mix, such that the fibrous bag material could fall apart and the package could release its contents into the mix.

U.S. Pat. No. 5,320,851 of de Mars et al. disclosed that semi-fluid or fluid cement admixtures could be encapsulated in a gelatin or wax that either ruptured, shattered, or disintegrated in the wet concrete during a period of mechanical mixing.

For non-soluble materials, such as the pulp component disclosed in Sugimoto et al. and Valle et al., and such as the wax component disclosed in de Mars et al., the mechanical agitation of the concrete mix must be sufficiently pursued to ensure that the packaging is sufficiently disintegrated within the cementitious mix.

The present inventors believe that faster and more convenient and economical packaging systems are needed.

SUMMARY OF THE INVENTION

In surmounting disadvantages of prior art packaging, the present invention provides water-insoluble, basic-medium-soluble polymeric packaging for making and/or modifying castable cementitious compositions. The packaging can be used for introducing cementitious binder(s), admixture(s), or a plurality of fibers, or a combination thereof, as a discrete unit into a mixer.

An exemplary packaging system of the invention comprises: at least one substance operative for making or modifying a castable cementitious composition; and a packaging for containing the at least one substance, the packaging having an integral member comprising a non-water-soluble, basic-medium-soluble polymeric material operative to package said at least one substance, to permit the introduction of said at least one substance into a mixer as a discrete unit, and to dissolve in a castable cementitious composition made or modified by said substance introduced by said packaging into a mixer. Exemplary polymeric packaging materials are prepared from a monomer mixture comprising an ester and an acid, the ester monomer having the structural formula

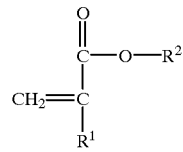

wherein $R^1$ represents H, $CH_3$, or $C_2H_5$; and $R^2$ represents $CH_3$, $C_2H_5$, $C_3H_7$, or $C_4H_9$; and the acid monomer having the structural formula

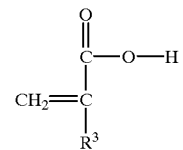

wherein $R^3$ represents H, $CH_3$, or $C_2H_5$. The ratio of ester to acid, preferably, is 1:1 to 20:1, and, more preferably, in the range of 3:1 to 4:1.

The packaging material is preferably extruded, molded, cast, spray-coated, dip-coated or otherwise formed into a continuous article or surface of an integral article, such as a film or rigid wall (e.g., self-supporting sheets) constituting the entire package or a portion of the packaging; or the packaging is made using the aforementioned polymeric material in a liquid-applicable form, such as a continuous coating for substances to be dispensed into a mixer. Preferably, the packaging is made by extrusion of continuous film or sheet or other shapes. The word "continuous" is herein used in the sense that the packaging material is substantially without pulp fibers being embedded in, or constituting, the wall of the packaging material. The packaging, for example, can be formed into a bag (e.g., pillow or pouch shape), a box, a tube, an envelope, a satchel, or a perimeter wrapping; or injection molding or blow molding, for example, can be used to make capsules, bottles, can shapes (e.g., cylindrical), or other rigid shapes (e.g., self-supporting either when empty or when filled with the substances) for packaging the additives or admixtures. The packaging material is also thermoplastic in nature, and therefore can be heat-seamed to seal at edges and openings. The packaging material of the invention does not dissolve under normal effects of water, unlike the materials taught by Smith et al. (U.S. Pat. No. 4,961,790). Moreover, unlike Valle et al. (U.S. Pat. Nos. 5,203,629; 5,224,774) and Sugimoto et al. (U.S. Pat. No. 5,224,595), the present invention does not require non-soluble pulp to be incorporated into the packaging walls.

Furthermore, the basic-medium-soluble polymers of the invention provide packaging material in a continuous form (e.g., film, coating, sheet, self-supporting wall, blow molded or injection molded shape such as a can, cylinder, bottle, shell, etc.) which is relatively easier to manufacture and handle, and can be broken down and dispersed more quickly in a cementitious composition in contrast to pulp fiber bags or wax encapsulates which require time-consuming mechanical comminution under abrasive mixing in a concrete mixing truck.

One advantage of the present invention, therefore, is the ability of the basic-medium-soluble material to be used in mortar cements which lack coarse aggregates.

Another advantage of using the basic-medium-soluble polymer as a packaging material is that its thermoplastic properties can be modified or enhanced. For example, in addition to the ability to provide three-dimensional shapes (e.g., capsules, ball shapes, etc.), the packaging can be melt-shrunken under the effect of heat (e.g., "shrink-wrap" type applications) such that the package (to be dispensed directly unopened or otherwise unreleased into the cement composition) can be made having a relatively smaller content-volume-to-outer-surface area ratio to facilitate introduction of the contained (or bundled, e.g., tied, perimeter wrapped) substance into, and disintegration and distribution within, the cementitious composition that is being modified. Thus, for example, the packaging can be used to pack structural reinforcing fibers in a densely packed formation (to increase bulk shipment capacity) while presenting minimal outer surface area. This could not be achieved using paper-based materials, which would lose strength when exposed to moisture.

Another advantage of the present invention is that it allows for use of dry or fluid admixtures, or a combination of both (so long as the admixtures packaged do not generate a basic medium operative to dissolve the packaging prematurely or contain organic solvents that dissolve the packaging material).

Moreover, packaging of the present invention can assume the shape of a bag, box, tube, or other shape to contain a plurality of fibers (and/or cement and other substances, such as admixtures, in dry or liquid form). Thus, the packaging can contain fibers for reinforcing concrete (and/or for inhibiting plastic shrinkage of concrete) and also containing a wet or dry water reducer (e.g., superplasticizer) for offsetting any decrease in concrete workability due to the fibers, as well as other admixtures (e.g., pigments, air control agents such as air entrainers, water repellants, permeability reducing agents, etc.) for further modification of the cementitious composition.

In other exemplary embodiments of the invention, a plurality of additives and/or admixtures can be packaged together in pre-measured quantities, such as combinations of air controlling agents (e.g., air entraining admixtures, air detraining admixtures) with one or more of superplasticizers, shrinkage reduction admixtures, corrosion inhibitors, and other admixtures. Due to the improved disintegration/selective-dissolvability of the packaging materials of the invention, separate packaged admixtures or admixtures can be contained within larger basic-medium-soluble packaging (e.g., a plurality of packages within a package), and thus be sold, shipped, and employed as an integrated system, preferably comprising separate packets or containers of premeasured admixture materials. Premeasured ingredients can help to reduce errors by the operator of the mixing truck or equipment at the site.

Thus, a further exemplary packaging of the invention comprises at least two different additive/admixture components within one or more basic-medium-soluble containers. For example, a plurality of fibers and an admixture (e.g., a superplasticizer) can be contained within the same package (e.g., bag, pouch, can, etc.) or within separate containers (e.g., a package of superplasticizer contained within a package of fibers. Another exemplary embodiment comprises an admixture in fluid form (e.g., a liquid superplasticizer) packaged separately with or within a cement or shotcrete mixture in dry form (e.g., dry powder) in a bag or other container shape.

Still further exemplary packaging systems and applications of the invention may comprise a complete system for making a cementitious composition, such as fireproofing composition or shotcrete, by containing premixed amounts of cementitious binder(s), aggregate(s), and other substances such as fibers, admixture(s), or mixture thereof. The packaging system is tossed directly into a mixer and torn or ruptured open by mechanical action of the mixer, whereby the contents can combine with water in the mixer to form a castable cementitious composition into which the packaging material dissolves. No packaging waste materials therefore hinder the construction operation.

The present invention thus can be said to provide methods for making and/or modifying castable cementitious compositions using the aforementioned packaging. Other advantages and features of the invention are disclosed in further detail herein.

BRIEF DESCRIPTION OF THE DRAWINGS

A further comprehension of the advantages and features of the invention may be facilitated by reference to the detailed description in conjunction with the accompany drawings wherein.

DETAILED DESCRIPTION OF EXEMPLARY EMBODIMENTS

Figure 1:
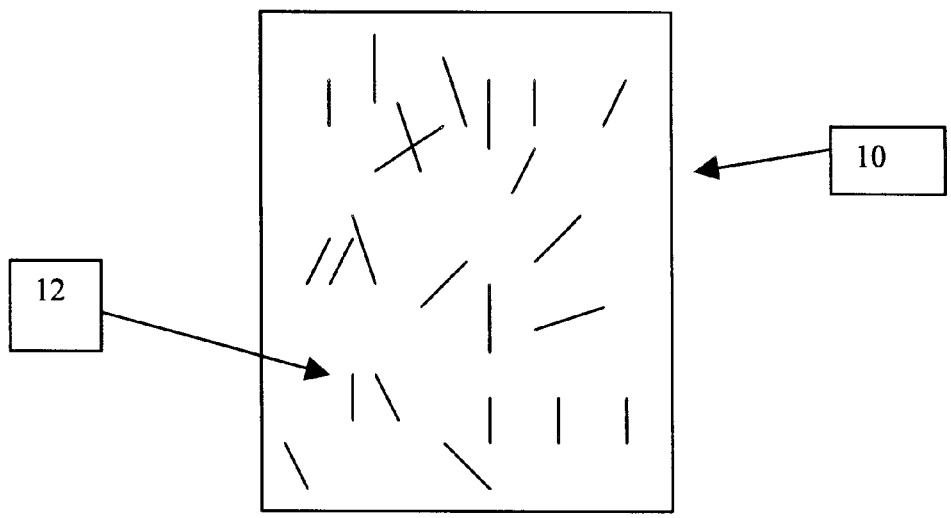
FIG. 1 is a diagrammatic representation of an exemplary basic-medium-soluble packaging system of the present invention, shaped as a bag or box, for containing a plurality of fibers.

The present invention concerns "selectively soluble" packaging, preferably made of a continuous film, coating, strip, or sheet material, that is not water soluble but, rather, is "basic-medium-soluble" (e.g., soluble in an alkaline environment). More particularly, the packaging dissolves only at high pH levels such as those that occur in fresh, castable cementitious compositions, e.g., mortar or concrete slurries such as ready-mix concrete, shotcrete, precast, fireproofing compositions, etc. The packaging does not simply dissolve in water, which is a neutral medium having a pH typically of around 7.

The term "castable cementitious composition" as used herein refers both to mixtures in both dry and liquid form. The terms "cement" and "cement composition" (which is synonymous with "cementitious compositions") may be used herein to refer to dry powders as well as to pastes, mortars, grouts such as oil well cementing grouts, and concrete compositions comprising a hydraulic cement binder. The terms "paste", "mortar" and "concrete" are terms of art: pastes are mixtures composed of a hydratable binder (usually, but not exclusively, Portland cement, masonry cement, or mortar cement and may also include gypsum, limestone, hydrated lime, fly ash, blast furnace slag, pozzolans, and silica fume or other materials commonly included in such cements) and water; mortars are pastes additionally including fine aggregate (e.g., sand), and concretes are mortars additionally including coarse aggregate (e.g., gravel, stone). Cement compositions can be formed by mixing required amounts of certain materials, e.g., a hydratable binder (such as cement and/or gypsum, water, and optionally fine and/or coarse aggregate, as may be applicable to make the particular cementitious composition being formed.

Exemplary basic-medium-soluble polymeric material for making the packaging of the invention may be prepared from a monomer mixture comprising an ester and acid, the ester monomer having the structural formula

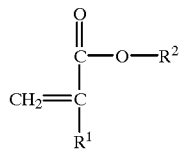

wherein $R^1$ represents H, $CH_3$, or $C_2H_5$; and $R^2$ represents $CH_3$, $C_2H_5$, $C_3H_7$, or $C_4H_9$; and the acid monomer having the structural formula

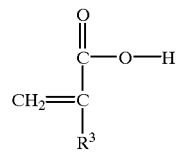

wherein $R^3$ represents H, $CH_3$, or $C_2H_5$. The ratio of ester to acid, preferably, is 1:1 to 20:1, and, more preferably, in the range of 3:1 to 4:1. The greater the content of the acid component, the faster the polymer material will tend to dissolve in the basic-medium.

The polymeric packaging material may optionally be made using other substances such as fillers, plasticizers, other polymers, and other optional ingredients, depending on the physical or chemical properties sought.

A film-forming, high pH soluble material, which is believed suitable for packaging/delivery of substances such as cementitious binders, additives and/or admixtures, and/or fibers into a mixer, as taught in the present invention, is believed by the present inventors to be disclosed in U.S. Pat. No. 4,870,148 of Belz et al., incorporated herein by reference. This film-forming material is believed to have good properties, particularly with respect to elasticity, strength, and a clearly defined dissolving capacity in an alkaline medium. The ester monomer used preferably has an alcohol group and 1 to 18 carbon atoms, and is more preferably a methyl acrylate, (methyl)methacrylate, ethyl acrylate, or butyl acrylate. The polymer can be a copolymer or a terpolymer, and a particularly suitable termonomer is a monomer from the group of vinyl ethers having 3 to 18 carbon atoms, such as vinyl isobutyl ether, aromatic vinyl hydrocarbons with 8 to 11 carbon atoms, particularly styrene, acrylate or methacrylate with an alcohol residue with 1 to 18 carbon atoms, and more particularly n-butyl acrylate, butyl methacrylate and stearyl methacrylate. The acrylate to organic acid mole ratio both in the case of the copolymer and in the case of the terpolymer may be preferably 3:1 to 5:1, especially 4:1. In the terpolymer, the organic acid to termonomer ratio is preferably 1:0.1 to 1:0.4, particularly 1:0.2 to 1:0.3.

The carboxyl group content of the polymers is preferably between 5 and 15%, and more preferably between 7 and 13%. Particularly preferred terpolymers are obtained from ethyl acrylate, methacrylic acid, and vinyl isobutyl ether.

More preferably, the basic-medium-soluble polymer materials useful in packaging of the invention may, for example, comprise a copolymer of 0.2 to less than 2.5 mol of (meth)acrylate per mole of (meth)acrylic acid and 0 to 0.5 mole of a neutral termonomer which differs from the (meth) acrylate. More preferably, the copolymer is of 0.2 to 2 mole, and in particular 0.4 to 0.8 mole of (meth)acrylate per mole of (meth)acrylic acid. The molar ratio of 0.5 to 1 is particularly preferred. It has been found that copolymers with such a high proportion of carboxylic acid or carboxyl groups can still be thermoplastically processed. Due to the presence of a large number of carboxyl groups, the copolymers can be dissolved in aqueous media on only adding small amounts of basic substances. This makes it possible to disintegrate or dissolve the copolymers and articles produced therefrom in aqueous media without adding alkalies or through only adding small amounts of alkalies, and the copolymer can be reprecipitated by slight acidification of the aqueous medium, so that it is possible to avoid an undesirably high salt formation during the neutralization process. The carboxyl content of the copolymer is preferably 30% to 50% and in particular 35 to 45% by weight, and about 40% by weight based on the polymer (without filler) being preferred.

Most preferably, the acrylate of the copolymer is methyl acrylate, the acid is preferably acrylic acid, and the copolymer is free of termonomers. If termonomers are present, then preference is given to acrylates or methacrylates, in which the alcohol radical has 2 to 19 and, more preferably, 2 to 6 carbon atoms.

The copolymer can be provided in the form of a thermoplastically processable powder or granular material, suitable for use in injection molding, compression molding, press molding, blow molding, deep-drawn part molding, or for use in forming sheets, plates, or other molded articles.

Water-soluble and/or water-insoluble fillers may be incorporated into the basic-medium-soluble polymer of the packaging of the invention to modify properties of the polymer. The fillers may be used in the amount of 10–90% by weight of the polymer. As it is believed that the filler content of the polymer can be very high without deterioration to the thermoplastic processability of the polymer mixture and strength of the molded article, it is possible to mold packaging articles with a basic-medium-soluble polymer having 30% to 80%, and more particularly 30% to 70%, by weight of at least one filler. For many applications, the preferred filler percentage will be about 40% to 60% by total weight in the polymer. Preferred fillers include talc, barium sulphate, calcium phosphate, mica, kaolin, and mixtures thereof. Preferably, the filler is insoluble in neutral aqueous media. The particle size of the fillers is preferably in the range of 0.1 to 2 mm or lower, and more preferably in the range of 0.2 to 1 mm. In the case of insoluble fillers, the particle range is preferably 0.1 to 200 µm, and more particular 0.2 to 50 µm. Preferably, the filler particulates should be at least one-third the thickness of the film or article being formed. If insoluble fillers are used, then the filler content is preferably lower and can be as low as 10% to by total weight of polymer.

The polymer may be produced using any conventional means known, such as twin-screw extruders, optionally having heating and/or cooling zones. Suitable processes are described in U.S. Pat. No. 4,870,148, as previously mentioned. The polymers which can be used in packaging of the invention can be made from films directly formed from the melt obtained through polymerization. The polymers can also be shaped by conventional processes, such as deep drawing, injection molding and compression.

Film, coating, or sheeting material can be made in whatever thicknesses needed for containing additives or admixtures used for modifying cementitious compositions. The thickness of films, for example, can be generally 5 micrometers to 2 mm. It can also be greater, such as approximately 40 to 500 micrometers, and in particular 40 to 120 micrometers, at least in the case of films and thin deep drawn parts. The thickness of the wall will depend upon the durability of the bag or container needed for packaging the admixtures and the dissolving time of the packaging in the castable cementitious composition. Thus, for example, bags or containers which are intended to be introduced into mortar or concrete, and which contain coarse aggregate (e.g., crushed gravel), can be made in relatively larger thicknesses. (The abrading and disruptive force of aggregates help to disrupt the packaging material and facilitate its dissolving process within the basic environment of the concrete mix).

In further exemplary embodiments, the packaging may be used for containing dry cement or cementitious materials (e.g., Portland cement, gypsum, shotcrete, etc.) that can be tossed into a mixer. The packaging can be used for packaging cement and one or more aggregates (e.g., sand), and perhaps other materials (e.g., fibers, admixtures, etc.). The packaging can be made as a bag or pouch and tossed directly into a mixer with water. Upon agitation of the mixer, the bag is ruptured open such that cementitious composition can be made in the mixer to dissolve the packaging material. Thus, no packaging waste materials remain at the construction site. Thus, a single package containing premeasured components for sprayable fireproofing or shotcrete, for example, containing the cementitious binder, aggregate, fibers, and one or more admixtures, can be made, shipped, and used conveniently and quickly at the site, while avoiding the problem of waste packaging material disposal at the site.

In further exemplary embodiments of the invention, two different admixtures can be packaged in similar basic-medium-soluble polymeric material of different thicknesses, if, for example, it is desired that one admixture be exposed to the castable cementitious mix before the other admixture is released. To illustrate on example, the present inventors explain that where clay-containing aggregates pose a problem for certain superplasticizers (as discussed in PCT Application No. PCT/US98/12876, which is incorporated herein by reference), the present inventors envision that a clay-activity modifying agent can be placed into a first bag and other admixtures (e.g., superplasticizers) can be placed in a second bag that was thicker than the first, so the first bag will presumably rupture first and allow the clay-activity modifying agents to become introduced to the clay before the superplasticizer is introduced. Thus, further exemplary embodiments of the invention comprise a packaging system whereby packages of different wall thicknesses are used to control sequence or rate at which admixtures are introduced into a castable cementitious composition.

As used herein, the term "packaging" can refer to means for bundling, confining, containing, packaging, packeting, or wrapping one or more admixtures to facilitate its/their introduction into a mixer where a castable cementitious composition, such as wet mortar or concrete mix, is made, so that, upon agitation of the wet cementitious mix, the packaging is dissolved. Thus, the term "packaging" includes, without limitation, bags, sacks, boxes, envelopes, perimeter wrapping (such as sleeves, twining, or circumferential jacketing), sealed tubes, bottles, cans (e.g., cylindrical shapes), torpedo or cigar shapes (e.g., cylindrical with tapered ends) which may be used for containing substances such as cementitious binder, fluid and/or dry additives or admixtures, or fibers, for use in making or modifying a castable cementitious composition. Of these packaging shapes, two-sided envelope-shaped bags are preferred due to their relative ease of manufacture and use. The packaging can be flexible (as in a bag or pouch) or "rigid," by which term is meant that the packaging means is self-supporting (either by itself or by inclusion of substance contained within the packaging).

Various shapes and combinations of exemplary packaging of the invention are illustrated in FIGS. 1 through 4. As shown in FIG. 1, an exemplary packaging system of the invention comprises water-insoluble, basic-medium soluble polymeric packaging material 10 formed into an integral material, such as a bag or box for containing one or more admixtures, and in this case a plurality of fibers (only a relatively few are shown for clarity of illustration in the drawings), such as designated at 12. The thickness of the packaging (e.g., bag) can vary depending on the strength desired. Exemplary bag thicknesses might be 2–10 mils, and more preferably 5–8 mils. Packages can be seamed and sealed using heat, conventional adhesives, or by using the same non-water-soluble, basic-medium-soluble polymer comprising the bag.

Figure 2:
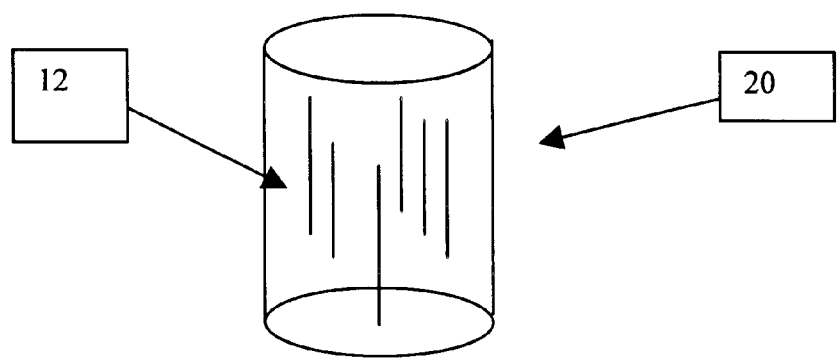
FIG. 2 is a diagrammatic representation of another exemplary packaging of the invention shaped as a can for containing fibers and/or other concrete admixtures.

As shown in FIG. 2, the packaging material can be molded, injection molded, blow-molded, or otherwise cast or shaped into a can 20. This can shape 20 may be particularly advantageous for packaging fibers, such as in situations where the fibers are compressed to occupy smaller volume and then packed densely within the can shape. This would help to decrease shipping costs for bulk fibers.

Figure 3:
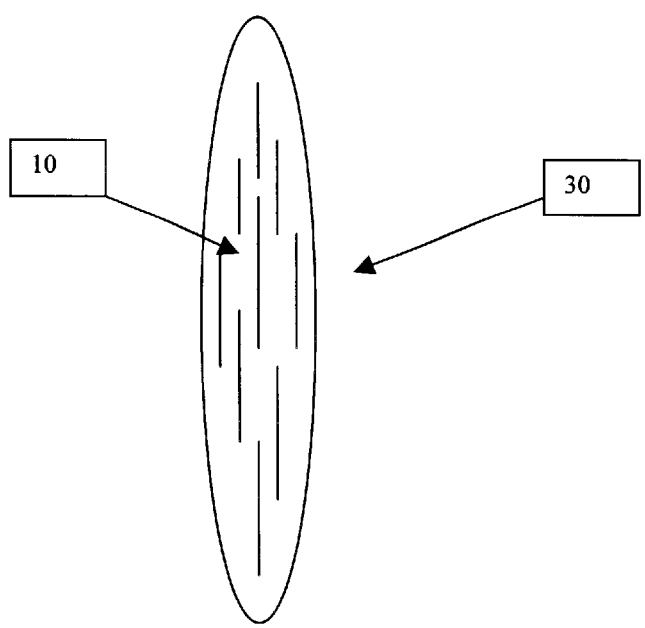
FIG. 3, is a diagrammatic representation of another exemplary packaging of the invention shaped as a "torpedo" for containing fibers.
Figure 4:
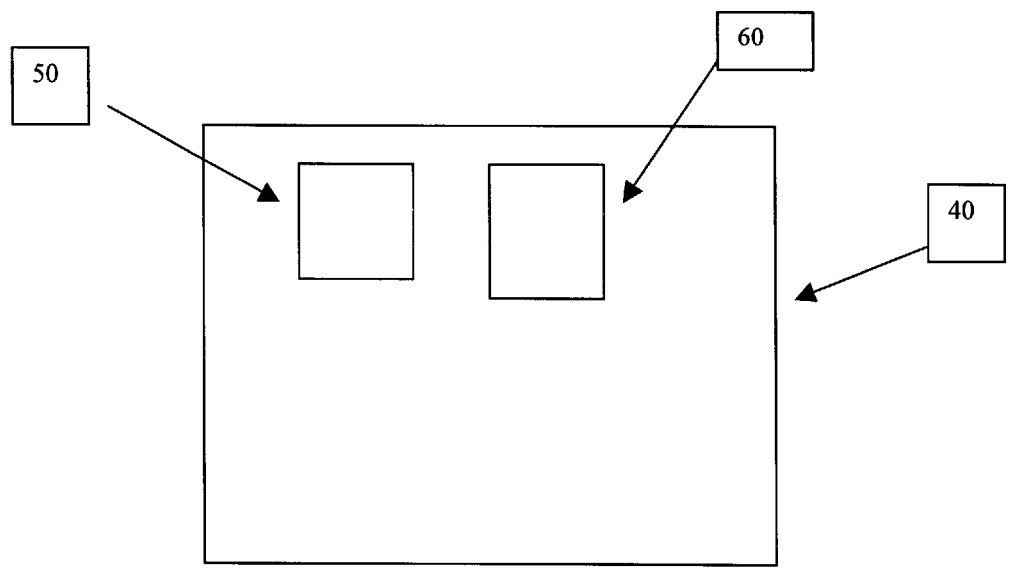
FIG. 4 is a diagrammatic representation of an exemplary packaging system of the invention which, in turn, contains other packaged admixtures of the invention.

In FIG. 3, the packaging material is shaped into a cigar or "torpedo" shape 30 which is similarly advantageous for incorporating a large volume of fibers 12 or admixtures (or combination thereof) through the relatively small opening of a concrete mixing truck. A larger container 40 can be used for packaging smaller containers 50 and 60 of admixtures and/or fibers (not separately illustrated, as shown in FIG. 4. Not only may fibers and admixtures be packaged together, but the present invention also permits dry (e.g., powder) and fluid (or semi-fluid) admixtures, therefore, to be separately packaged within a larger packaging container (so long as in the fluid state the substance does not generate a basic medium that dissolves the packaging material).

For example, smaller envelopes or pouches of fibers can be packaged, along with one or more admixtures (e.g., water reducing admixtures, plasticizers or superplasticizers, etc.) within a larger container, such as a box or carton, that facilitates palletizing. The entire package can be introduced directly into a concrete mix and broken up/dissolved using a mixer.

Figure 5:
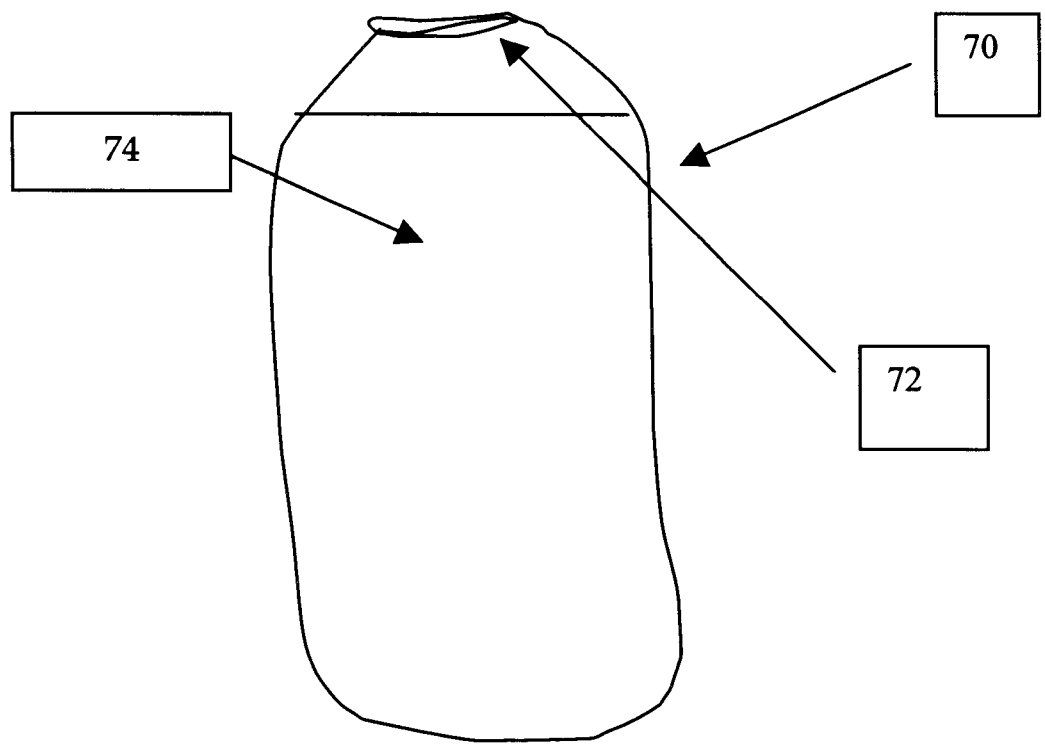
FIG. 5 is a diagrammatic representation of an exemplary packaging system of the invention shaped as a bottle.

As shown in FIG. 5, liquid admixtures can be contained in packaging that is bottle-shaped 70. The non-water-soluble, basic-medium soluble polymer can be blow molded, for example, and then heat-seamed at the top 72 of the bottle after the admixture or admixtures 74 are loaded into the container 70.

Exemplary packages of the invention contain one or more substances (otherwise called "additives" or "admixtures") to be incorporated into a castable cementitious mix, a cement (e.g., Ordinary Portland Cement), or other cementitious material such as gypsum, limestone, furnace slag, pozzolans, or fly ash. They may also contain "admixtures," a term of art designating components other than cement, aggregate, and water, which are used to modify one or more properties of concrete (which is composed of a cement, fine aggregate such as sand, and coarse aggregate such as crushed stone and/or gravel) or mortar (cement, fine aggregate). Conventional admixtures include water reducers, superplasticizers, air entraining agents, air-entraining water-reducing agents, super air-entraining water-reducing agents, setting accelerating agents, setting retarders, separation reducing agents, rust and/or corrosion inhibitors, expanding agents, polymer mixing agents, shrinkage reducing agents, coloring agents, surfactants, permeability reducing agents, and reinforcing materials such as fibers, and these are all believed to be suitable for use with the packaging systems of the invention.

Lists of conventional admixture materials are by now commonly found in the art, and, for example, can be found in U.S. Pat. No. 4,961,790 of Smith et al.; U.S. Pat. Nos. 5,203,629 and 5,224,774 of Valle et al.; and U.S. Pat. No. 5224,595 of Sugimoto et al., all of which are incorporated as if set forth herein.

Preferred embodiments of the invention comprise the above-described non-water-soluble, basic-medium-soluble polymeric packaging (having walls are made of the extruded or blow-molded polymer material in continuous form, heat-sealed or adhesively seamed along one or more wall edges, to provide an enclosure) containing a plurality of fibers which are operative to reduce plastic shrinkage in wet concrete or mortar or which are operative to provide structural reinforcement to concrete or mortar when hardened. Conventional fibers and fiber materials are contemplated for use in the invention. Fibers are typically elongate in shape and have lengths which far exceed fiber thickness and/or width, and are available in monofilament or fibrillated form. Fibers can also be used in the form of fibrillatable sheets, for example). Known fiber materials comprise steel, glass, carbon, acrylic, polyester, polyamide (e.g. nylon), polyolefin (e.g., polyethylene, polypropylene, or mixture thereof), cellullosic materials, or a mixture thereof. Fiber materials customarily used in the industry for reinforcing and/or reducing crack shrinkage in concrete and cementitious compositions are especially preferred for use in the present invention, because their loading into cementitious slurries is an especially time-consuming problem at the construction site. The packeting systems of the present invention are believed especially suited for mixing polyolefin fiber materials, which are generally hydrophobic, into aqueous slurry environments such as concrete mixes. Fibers may be optionally coated, for example, with conventional wetting agents or surfactants to alter their surface tension characteristics. Examples of such materials include fatty acid esters of glycerides, fatty acid amides, polyglycol esters, polyethoxylated amides, non-ionic surfactants and cationic surfactants. Alternatively, the fibers may be coated with bond enhancement materials, for example, such as the glycol or glycerol ether bond enhancement agents as taught in U.S. Pat. No. 5,753,368 of Berke et al., which is incorporated by reference herein.

As the packaging materials contemplated for use in the invention can be thermoplastic, it is envisioned that further exemplary materials can be incorporated, such as plasticizers, for example organic esters, phthalates, diisobutyl phthalate, diisodecyl phthalate (DIDP), and others. The packaging materials can also include other optional ingredients, such as strengtheners, e.g., talc, calcium carbonate, and clay up to 10–20% by weight based on the entire weight of the packaging material.

It is claimed:

1. Packaged composition, comprising: a basic-medium-soluble polymeric packaging enclosing a composition; said composition comprising at least one admixture for modifying a castable cementitious composition, a plurality of fibers, a dry hydratable cementitious binder material, or mixture thereof, wherein said polymeric packaging comprises a film or coating formed from a copolymer provided by the reaction of a monomer mixture comprising an ester and an acid, the ester monomer having the structural formula

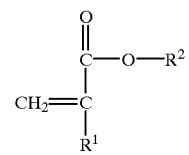

wherein $R^1$ represents H, $CH_3$, or $C_2H_5$; and $R^2$ represents $CH_3$, $C_2H_5$, $C_3H_7$, or $C_4H_9$; the acid monomer having the structural formula

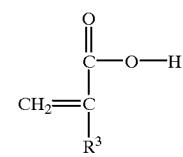

wherein $R^3$ represents H, $CH_3$, or $C_2H_5$; said film or coating thereby being operative to dissolve in a castable cementitious composition and to release said enclosed composition from said packaging.

2. The packaging system of claim 1 wherein said polymeric material of said integral packaging member is prepared from a monomer mixture comprising an ester and an acid, the ester monomer having the structural formula

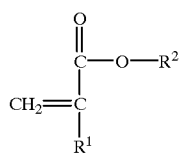

wherein R¹ represents H, $CH_3$, or $C_2H_5$; and R² represents $CH_3$, $C_2H_5$, $C_3H_7$, or $C_4H_9$; the acid monomer having the structural formula

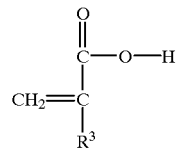

wherein R³ represents H, $CH_3$, or $C_2H_5$.

3. The packaged composition of claim 1 wherein said ester and said acid monomers are employed in a ratio of 1:1 to 20:1.

4. The packaged composition of claim 1 wherein said ester and said acid monomers are employed in a ratio of 3:1 to 4:1.

5. The packaged composition of claim 1 wherein said polymeric packaging film or coating further comprises at least one filler.

6. The packaged composition of claim 1 wherein said polymeric packaging film or coating further comprises a plasticizer.

7. The packaged composition of claim 1 wherein said polymeric packaging film or coating comprises a copolymer of ethyl acrylate and methacrylic acid.

8. The packaged composition of claim 1 wherein said polymeric material film or coating is thermoplastic.

9. The packaged composition of claim 1 wherein said packaging has a shape selected from the group consisting of a bag, a box, a tube, an envelope, a capsule, a pouch, a perimeter wrapping, a bottle, a cylindrical shape.

10. The packaged composition of claim 1 wherein said dry hydratable cementitious powder is selected from the group consisting of Portland cement, gypsum, limestone, silica fume, furnace slag, pozzolans, and fly ash.

11. The packaged composition of claim 1 wherein said composition enclosed by said polymeric packaging comprises at least one admixture selected from the group consisting of a water reducer, superplasticizer, air entraining agent, air-entraining water-reducing agent, super air-entraining water-reducing agent, air detraining agent, setting accelerating agent, setting retarder, separation reducing agent, rust inhibiting agent, corrosion inhibiting agent, expanding agent, polymer mixing agent, shrinkage reducing agent, coloring agent, surfactant, and permeability reducing agent.

12. The packaged composition of claim 1 wherein said composition enclosed in said polymeric packaging is a plurality of fibers.

13. The packaged composition of claim 1 wherein said basic-medium-soluble packaging has a bag shape, and said packaging encloses a plurality of fibers.

14. The packaged composition of claim 1 wherein said packaging encloses further for introducing another composition into a castable cementitious composition.

15. The packaged composition of claim 1 wherein said packaging has a box shape, and said packaging encloses at least one other packaging.

16. The packaged composition of claim 15 wherein said box-shaped packaging contains a plurality of other packaging each further enclosing a plurality of fibers, an admixture, or combination thereof.

17. The packaged composition of claim 1 wherein said packaging has a torpedo shape.

18. The packaged composition of claim 1 wherein said composition enclosed within said polymeric packaging comprises a plurality of fibers contained in a closely-packed, generally aligned state within said polymeric packaging.

19. The packaged composition of claim 1 wherein said packaging contains both dry and fluid substances comprising a plurality of fibers, at least one admixture, or a combination thereof.

20. The packaged composition of claim 1 wherein said packaging contains at least one fluid admixture and said packaging has a bottle shape.

21. The packaged composition of claim 20 wherein said bottle has an opening that is heat sealed.

22. Method for making or modifying a cementitious composition, comprising introducing into a hydratable cementitious composition the packaged composition of claim 1.

23. The method of claim 22 wherein said castable cementitious composition is a ready-mix concrete.

24. The method of claim 22 wherein said castable cementitious composition is shotcrete.

25. The packaged composition of claim 1 wherein said composition enclosed by said packaging comprises at least one wet admixture and at least one dry admixture.

26. The packaged composition of claim 14 wherein said at least one other packaging comprises packaging having a different thickness.

27. The packaged composition of claim 1 wherein said composition enclosed by said packaging comprises a plurality of fibers, a superplasticizer, and an air entraining agent.

28. The packaged composition of claim 27 wherein said superplasticizer and said air entraining agent are in dry form.

29. Method for making a castable cementitious composition, comprising introducing into a mixer a hydratable cementitious binder and the packaged composition of claim 1.

30. Method of claim 29 wherein said packaged composition comprises packaging enclosing a dry hydratable cementitious binder material.

31. Method of claim 30 wherein said packaged composition further comprises a plurality of fibers, at least one admixture, or mixture thereof.

32. Method of claim 29 wherein said packaged composition comprises packaging enclosing cement, fine aggregate, coarse aggregate, silica fume, fly ash, fibers, fillers, admixtures, or mixture thereof.

33. Method of claim 32 wherein said packaging encloses at least two of said materials.

34. The method of claim 29 wherein said packaged composition comprises packaging enclosing a dry cement and at least one aggregate.

35. The method of claim 29 wherein said packaging encloses a dry hydratable cementitious binder, at least one aggregate, and at least one other substance selected from the group consisting of an admixture and a plurality of fibers.

* * * * *